United States Patent
Egilsson et al.

(10) Patent No.: US 12,296,738 B2
(45) Date of Patent: May 13, 2025

(54) SPORTS CAMPER STRUCTURE

(71) Applicant: MINK CAMPERS EHF., Gardabaer (IS)

(72) Inventors: Egill Sveinbjörn Egilsson, Reykjavik (IS); Olafur Gunnar Sverrisson, Alftanes (IS); Olafur Freyr Halldorsson, Reykjavik (IS)

(73) Assignee: MINK CAMPERS EHF., Gardabaer (IS)

( * ) Notice: Subject to any disclaimer, the term of this patent is extended or adjusted under 35 U.S.C. 154(b) by 39 days.

(21) Appl. No.: 17/911,278

(22) PCT Filed: Mar. 15, 2021

(86) PCT No.: PCT/IS2021/050006
§ 371 (c)(1),
(2) Date: Sep. 13, 2022

(87) PCT Pub. No.: WO2021/181430
PCT Pub. Date: Sep. 16, 2021

(65) Prior Publication Data
US 2023/0129706 A1 Apr. 27, 2023

(30) Foreign Application Priority Data
Mar. 13, 2020 (IS) .......................................... 050294

(51) Int. Cl.
*B60P 3/32* (2006.01)
(52) U.S. Cl.
CPC ..................................... *B60P 3/32* (2013.01)

(58) Field of Classification Search
CPC ......... B60P 3/32; B62D 29/04; B62D 29/048; B62D 63/06
USPC .................................................. 296/156, 168
See application file for complete search history.

(56) References Cited

U.S. PATENT DOCUMENTS

| | | | |
|---|---|---|---|
| 2,894,783 A | 7/1959 | Bird | |
| 5,066,067 A | 11/1991 | Ferdows | |
| 5,653,494 A | 8/1997 | Cleall | |
| 5,921,043 A | 7/1999 | McDonald | |
| 7,806,463 B2 * | 10/2010 | Oliver | B60R 15/00 296/168 |

(Continued)

FOREIGN PATENT DOCUMENTS

| | | |
|---|---|---|
| FR | 2324195 A5 | 4/1977 |
| GB | 899865 A | 6/1962 |

(Continued)

OTHER PUBLICATIONS

ICON Direct Skylights, located at https://www.icondirect.com/rv-skylight-sl1422/; retrieved via Internet Archive Wayback Machine; as existed Oct. 23, 2018. (Year: 2018).*

(Continued)

*Primary Examiner* — Jason S Daniels
(74) *Attorney, Agent, or Firm* — Tarolli, Sundheim, Covell & Tummino LLP (57) ABSTRACT

The present invention relates to a sports camper of a teardrop caravan type having rounded corners to give the housing of the caravan a egg-like shape. The sports camper of the present invention is designed to be lightweight having increased structural strength and wear.

23 Claims, 4 Drawing Sheets

(56) References Cited

U.S. PATENT DOCUMENTS

| | | | |
|---|---|---|---|
| 8,534,215 B2* | 9/2013 | Lee | B60P 3/1041 |
| | | | 114/344 |
| 10,112,248 B2* | 10/2018 | Gould | C22C 18/04 |
| 10,144,582 B2* | 12/2018 | Ebnöther | B60P 7/0815 |
| 10,414,322 B1 | 9/2019 | Coulter | |
| 11,479,095 B2* | 10/2022 | Hawkins | B60J 7/1607 |
| 2003/0006627 A1 | 1/2003 | Votruba | |
| 2006/0001230 A1* | 1/2006 | Finch | B62K 27/003 |
| | | | 280/204 |
| 2006/0273622 A1* | 12/2006 | Laird | B60P 3/105 |
| | | | 296/168 |

FOREIGN PATENT DOCUMENTS

| | | | |
|---|---|---|---|
| GB | 1211155 A | 11/1970 | |
| KR | 100732386 B | 6/2007 | |
| NL | 1024289 C | 3/2005 | |
| WO | 2020044262 A1 | 3/2020 | |

OTHER PUBLICATIONS

PCT International Search Report and Written Opinion for corresponding International Application Serial No. PCT/IS2021/050006, mailed Jun. 8, 2021, pp. 1-13.

Search Report—Iceland for corresponding Application Serial No. SE 2020 00904, dated Jul. 22, 2020, pp. 1-2.

\* cited by examiner

SPORTS CAMPER STRUCTURE

RELATED APPLICATIONS

This application is a U.S. National Stage Application filed under 35 USC 371, claiming priority to Serial No. PCT/IS2021/050006, filed on 15 Mar. 2021: which claims priority from IS Patent Application 050294, filed 13 Mar. 2020, the entireties of which are hereby incorporated herein by reference.

FIELD OF THE INVENTION

The present invention relates to towable caravan trailer assembly. Moreover, the present invention provides a simple design of a lightweight sports camper with increased structure strength.

BACKGROUND OF THE INVENTION

Caravans, travel trailer and campers are terms used for a housing on wheels towed behind cars on roads to provide a more comfortable sleeping arrangement during camping trips than the use of a tent. Leisure caravans have been known for over a century and have been fashionable in different sizes at different times through the years.

Teardrop trailers were popular between 1930 and 1960 with a small body having a tear drop shape and wheels outside the body. The inside allowed for a madras on the floor for two people to sleep on and some space for clothing and such, whereas a galley for cooking is usually arranged from the outside in the rear under a hatch. The teardrop trailers provided a lighter towing alternative to larger caravans giving people with smaller cars the opportunity to tow such a leisure vehicle. The teardrop shape of these trailers presented lower air resistance and a generally fashionable look.

WO09156727A1 discloses a small caravan trailer where the pod can be demounted from the trailer assembly by the user. The pod is releasably secured to the chassis of the trailer assembly and it is secured to the chassis by means of clip assemblies, which allow a user quickly and easily to release the pod and demount it from the trailer assembly without the use of tools and it is sufficiently portable to be readily carried by able-bodied people.

US2008211259A discloses a teardrop travel trailer having an airfoil shape with a leading-edge region at the front, a trailing edge region at the rear with two relatively flat opposite sides. The superior surface, extending from the leading-edge region to the trailing edge region, can be deployed from a travelling position into a roof for a habitat configuration by pivoting around a transversal axis located along the leading-edge region.

There is a growing demand for more environmentally friendly vehicles and electric cars and hybrid cars are becoming more usual. With smaller vehicles using less fossil fuel based energy, the caravans need to become lighter and smaller. Most previous and current campers are relatively heavy and not well suited for smaller vehicles to tow, but making the caravans lighter has had the tendency to make them more fragile. Another problem with small caravan trailers is that they are difficult to mass produce which makes them more expensive than the need to be.

SUMMARY OF THE INVENTION

The present invention relates to a sports camper of a teardrop caravan type having rounded corners to give the housing of the caravan a egg-like shape. The sports camper of the present invention is designed to be lightweight having increased structural strength and wear. The individual components of the housing, their design and assembly together with the assembly of the housing itself provides a rigid structure with an egg-like shaped housing for giving the structure increased strength and allowing the housing to be made from softer material. The way the units making up the housing are assembled provides increased strength for the housing adding to the strength provided by the sturdy design, which is built for endurance.

The camper of the present invention has a trailer carrying frame structure on wheels and a cradle like shell attached to the trailer, where the housing rests in and is attached to the cradle. The material used for the cradle and for the housing is selected such that the cradle material is more wear resistant as it is mounted on metal and is subjected to much wear during on and off-road driving, but it is also softer than metal and protects a softer material used in the housing. The egg-like shaped housing is assembled from two opposite side panels, where at least one of the side panels has a door, and at least two connecting panels for connecting the side panel and to make up the roof, the floor and the front and the rear end of the camper. Both the opposite side panels and the connecting panels representing the front, the back, the lower and the upper side of the housing are made from an outer shell and an inner shell with an insulation material between the inner and outer shell. Each unit making up the housing, such as each side panel, is assembled prior to assembly of the housing by attaching the inner and outer shell together on the peripheral edges of each unit and optionally as well through indents or other connecting structures in either of the shells, which also provides increased strength of each unit. Then the assembled building units are attached together, also on their peripheral edges providing increased strength to the housing.

The inner and outer shell of each panel and the panels making up the housing of the caravan are designed to have the peripheral edges shaped to be parallel to the corresponding peripheral edge it is to be connected to. Therefore, for the connecting peripheral edges of an inner shell and the corresponding outer shell of each panels form a parallel contacting or coinciding surfaces to be fixed or attached together by means, such as glue. In the same manner the connecting peripheral edges each panel form a parallel contacting or coinciding surfaces to the panel it will be attached or fixed to during assembly.

The separation panel separating the sleeping section and a cooking section provides increased strength to the housing as well, and the connecting points to the separation panel on side panels and the top and bottom panel are designed such that the outer shell and inner shell of each panel connect providing increased strength for each panel. In order to be able to make the housing from a more flexible and lighter, the selection of material for the inner and outer shell of the housing is selected from material such as ABS plastic, whereas the material for the cradle is more wear resistant such as fibre plastic. In some embodiments connecting points between the panels are in the are of the upper and lower corners of the housing. The corners of the housing are rounded or concave contributing the egg-like shape of the housing giving the housing increased strength and the addition of having one or more of the connecting points for the panels in the rounded or concave area gives the housing increased strength.

The caravan of the present invention can be provided with means for generating electricity, such as a solar cell on the roof or a generator in the wheel system, which generates electricity for the caravan or an electric car. The caravan uses electricity for a ventilation system, such as any means for providing a temperature controlled airflow through the caravan. The interior of the caravan is simple with a floor section covered by a madras, and a separation panel separating the sleeping section and a cooking section accessible from the hatch opening of the caravan.

It is an object of the present invention to overcome or ameliorate the aforementioned drawbacks of the prior art and to provide an improved and/or alternative and/or additional method and assembly of a caravan trailer where the individual units used to make up the housing are made from an inner and outer shell, where each individual unit is attached together before the units used to make up the housing are attached together. It is one preferred object of the present invention to provide a caravan trailer with an egg-shaped housing design in a plastic material mounted on a plastic material cradle on chassis to provide a lightweight caravan. Moreover, it is a preferred object of the present invention to provide caravan trailer where the housing is made from building panels of flexible plastic material, where the peripheral edges both inner and outer shell as well as of each panel are shaped to be parallel to the corresponding peripheral edge it is to be connected forming a parallel contacting or coinciding surfaces to be fixed or attached together by means, such as glue.

The object(s) underlying the present invention is (are) particularly solved by the features defined in the independent claims. The dependent claims relate to preferred embodiments of the present invention. Further additional and/or alternative aspects and embodiments are discussed below.

Thus, at least one of the preferred objects of the present invention is solved by a caravan trailer comprising i) a chassis further comprising wheels, ii) a cradle portion mounted on the chassis, iii) a housing secured in the cradle portion, where the housing is assembled from a plurality of panels, further comprising: a) at least two opposite side panels, b) at least two connecting panels forming the front, the back the lower and the upper side of the housing, and a door. Each of the plurality of panels are made from an inner shell and an outer shell, where the inner shell and the outer shell of each of the plurality of panels have parallel peripheral edges for connecting the inner shell and the outer shell prior to assembly.

Another object of the invention is solved by a method for assembling a caravan trailer. The method comprises the following steps:
a) providing a chassis further comprising wheels,
b) providing a cradle portion and mounting said cradle portion on said chassis,
c) providing a housing, said housing being assembled from and containing:
  i) opposite side panels,
  ii) at least two connecting panels forming the front, the back the lower and the upper side of the housing,
  iii) a door,
d) wherein the opposite side panels and the at least two connecting panels are made from an inner shell and an outer shell,
e) said inner shell and an outer shell being connected on the peripheral edges prior to assembly,
f) connecting the opposite side panels and the at least two connecting panels on their peripheral edges, and mounting said housing on said cradle portion.

Another object of the invention is solved by a housing for a caravan trailer where the housing is assembled from and containing the following components/units: a) opposite side panels, b) at least two connecting panels forming the front, the back the lower and the upper side of the housing, and a door. The opposite side panels and the at least two connecting panels are made from an inner shell and an outer shell, where the inner shell and an outer shell are connected or attached together on the peripheral edges prior to assembly.

Another preferred objects of the present invention is solved by a caravan trailer comprising i) a chassis further comprising wheels, ii) a cradle portion mounted on the chassis, iii) a housing secured in the cradle portion, where the housing is assembled from and containing the following components/units: a) opposite side panels, b) four connecting panels, the four connecting panels forming a front panel, a back panel, a lower panel and a upper panel of the housing, wherein the opposite side panels and the four connecting panels are made from an inner shell and an outer shell, c) a hatch in the back of the caravan to open into a boot portion of the caravan, d) a hatch panel portion between the upper panel and the back panel of the housing, e) an interior panel separating the boot portion from the rest of the housing, f) an insulation layer between inner shell and the outer shell of the opposite side panels and the four connecting panels, where the inner shell and an outer shell are connected or attached together on the peripheral edges prior to assembly.

DESCRIPTION OF THE INVENTION

The following definitions and embodiments relate to the method, the apparatus of the invention.

In the present context the term "parallel peripheral edges" refers to the edge of any two building components of the caravan and the formation of a portion of the surface near and to the edge to be parallel to each other when placed next to each other for assembly.

In the present context the terms "mating", "contacting" and "coinciding" surfaces are used equally to describe how two surfaces areas, such as the parallel peripheral edges, are shaped for full contact when placed next to each other for assembly.

In an embodiment of the present invention the peripheral edge of the inner shell of each of the plurality of panels forms a parallel coinciding surface to the peripheral edge of a corresponding outer shell. The parallel coinciding surfaces may be partially flat.

In an embodiment of the present invention the parallel peripheral edges for connecting the inner shell and an outer shell of each of the plurality of panels comprise a substantially flat portion along the periphery of each panel.

In an embodiment of the present invention the parallel peripheral edges for connecting the inner shell and an outer shell of each of the plurality of panels comprise a flat portion along the periphery of each panel such that the flat portion of the peripheral edge of an inner shell forms a parallel mating/contacting/coinciding surface to the flat portion of the peripheral edge of a corresponding outer shell.

In an embodiment of the present invention the inner shell of one or more of the plurality of panels further comprise structural indents or protrusions in the middle section of the inner shell forming a parallel mating or contacting or coinciding surface to a surface in the middle section of the outer shell of the corresponding panel.

In an embodiment of the present invention structural indents or protrusions in the middle section of the inner shell comprises a flat portion forming a parallel coinciding surface to a flat surface in the middle section of the outer shell of the corresponding panel.

In an embodiment of the present invention the parallel peripheral edges of each of the panels form a parallel mating or contacting or coinciding surface to the peripheral edge of the corresponding peripheral edge of the panel it is being designed to connected to.

In an embodiment of the present invention the parallel contacting or coinciding surfaces of the inner shell and an outer shell of each of the panels comprise connection or fixing points or areas for attaching or fixing together each panel prior to assembly of the caravan trailer.

In an embodiment of the present invention the parallel contacting or coinciding surfaces of each of the panels comprise connection/fixing points or area for attaching or fixing together the panels of the housing during assembly of the caravan trailer.

In an embodiment of the present invention the attaching or fixing together the inner shell and an outer shell of each panel and the attaching or fixing together the panels of the housing is made with chemical attachment, such as glue, like a two-component glue.

In an embodiment of the present invention the caravan trailer further comprises a hatch in the back of the caravan to open into a boot portion of the caravan.

In an embodiment of the present invention the at least two connecting panels comprise four connecting panels, the four connecting panels being a front panel, a back panel, a lower panel, and a upper panel of the housing.

In an embodiment of the present invention the caravan trailer further comprising a hatch panel portion between the upper panel and the back panel of the housing.

In an embodiment of the present invention the caravan trailer further comprising an interior panel separating the boot portion from the rest of the housing.

In an embodiment of the present invention the caravan trailer further comprising a window in the top panel.

In an embodiment of the present invention the inner shell and the outer shell of the opposite side panels and the at least two connecting panels have an insulation layer between them.

In an embodiment of the present invention the opposite side panels and the at least two connecting panels connect through indents in the inner or outer shell.

In an embodiment of the present invention the connecting corners between the opposite side panels and the at least two connecting panels are curved or concave.

In an embodiment of the present invention the opposite side panels and the at least two connecting panels are made from ABS plastic.

In an embodiment of the present invention the cradle is made from material which is harder than the material of the housing but protects the housing, such as plastic materials, such as fibre plastic. The shape of the cradle is such that it coincides with the shape of the bottom portion of the housing.

In an embodiment of the present invention the inner shell and an outer shell the opposite side panels and the at least two connecting panels are connected on the peripheral edges and optionally in the middle section of each prior to assembly.

In an embodiment of the present invention the units forming the outer shell and the connections between outer shell and inner surface panel are made with two component glue.

In an embodiment of the present invention the inner shell and an outer shell units forming the housing, including the side panels and the at least two connecting panels have connection or fixing points and are connected and fixed together on the connection or fixing points being the peripheral edges of each panel.

In an embodiment of the present invention the one or more of the inner shell and an outer shell units forming the housing are further connected and fixed together in the middle section of each of the one or more of the inner shell and an outer shell units.

In an embodiment of the present invention the opposite side panels and the at least two connecting panels are attached together through indents or protrusions in the inner or outer shell in the middle section of each of the opposite side panels and the at least two connecting panels.

In an embodiment of the present invention the attachment of the opposite side panels and the at least two connecting panels and through indents or protrusions in middle sections of said panels is made by using a two-component glue.

In an embodiment of the present invention the housing further comprises a drain in the bottom panel of the housing.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

In the following, exemplary embodiments of the invention will be described, referring to the figures. These examples are provided to provide further understanding of the invention, without limiting its scope.

Figure 1:
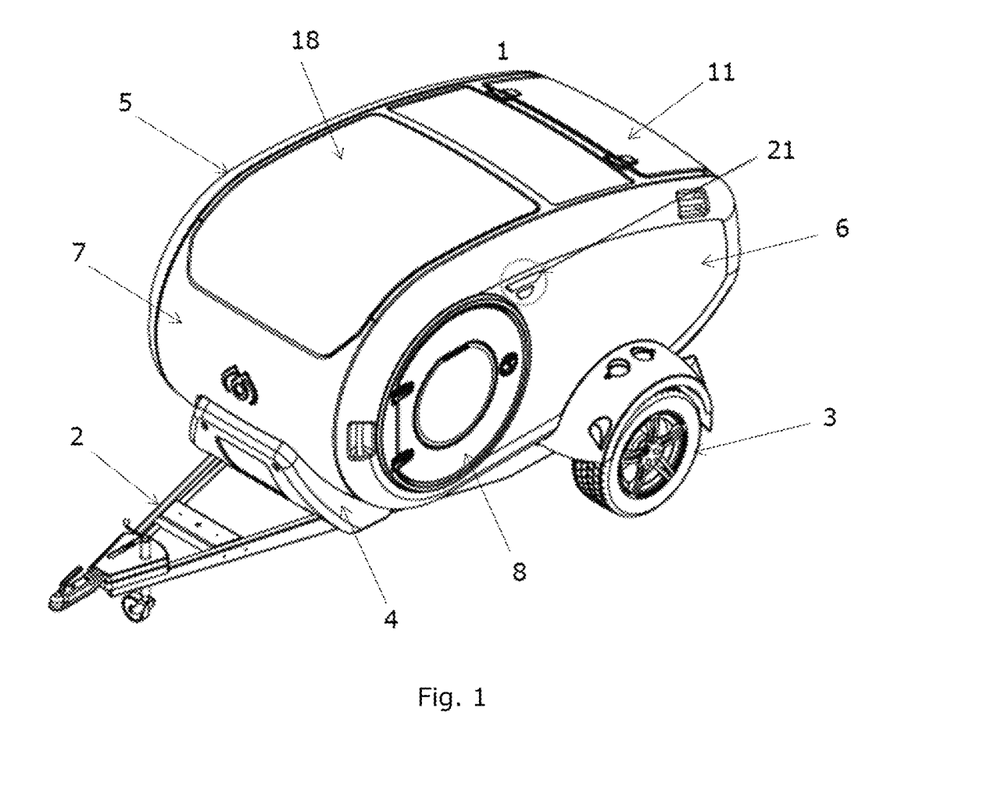
FIG. 1 is a perspective view of a caravan trailer according to the invention.

FIG. 1 shows perspective view of a caravan trailer 1 according to the invention. The caravan trailer comprises a chassis 2 on wheels 3, a cradle 4 mounted on said chassis 2 and a housing 5 secured in the cradle portion. The housing 5 is assembled from opposite side panels 6, at least two connecting panels 7 forming the front, the back the lower and the upper side of the housing and a door 8. The caravan trailer 1 shown in FIG. 1 has a hatch 11 in the back of the caravan to open into a boot portion 17 of the caravan. A ventilation air-inlet 21 is shown in the side panel behind the door 8 of the caravan housing 5.

Figure 2:
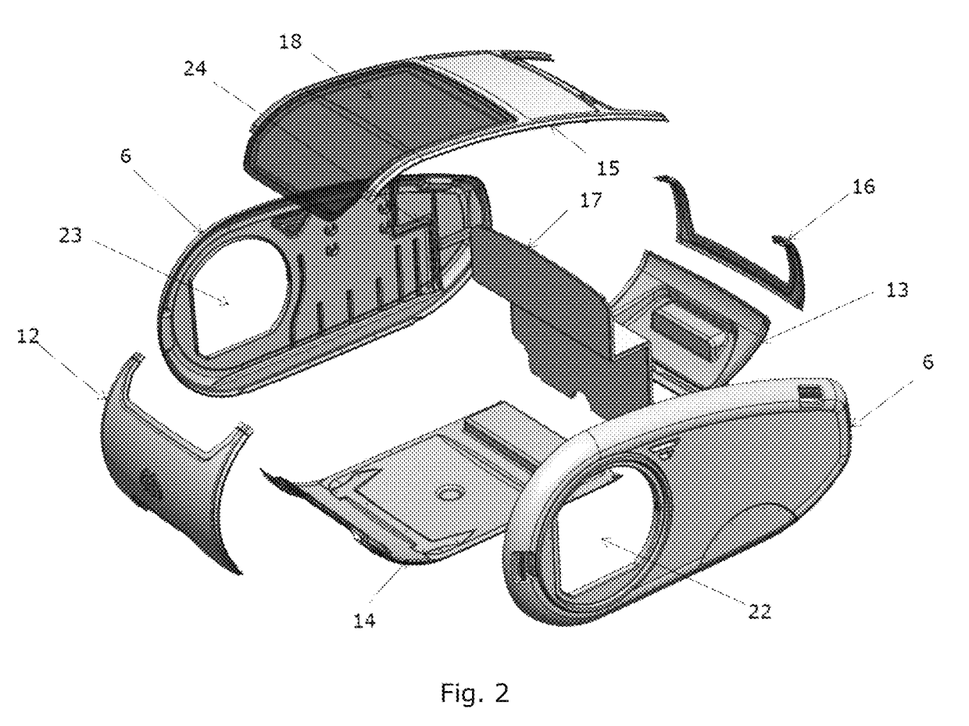
FIG. 2 is an explosive view of the housing of the caravan trailer.

FIG. 2 is an explosive view of the housing of the caravan trailer outlining the individual panels assembled from for making the housing. The opposite side panels 6 have semicircular openings in the front part of the panel for fitting in a window on one side and a door on the other side. The connecting panels in the embodiment shown in FIG. 2 are five. The front panel 12 is connected to the lower panel 14 and the upper panel 15, whereas the back panel 13 is connected to the lower panel 14 and a hatch panel portion 16 which then connects to the upper panel 15. The figure also shows a window 18 in the top panel of the housing and an interior panel separating the boot portion 17 from the rest of the housing.

Figure 3:
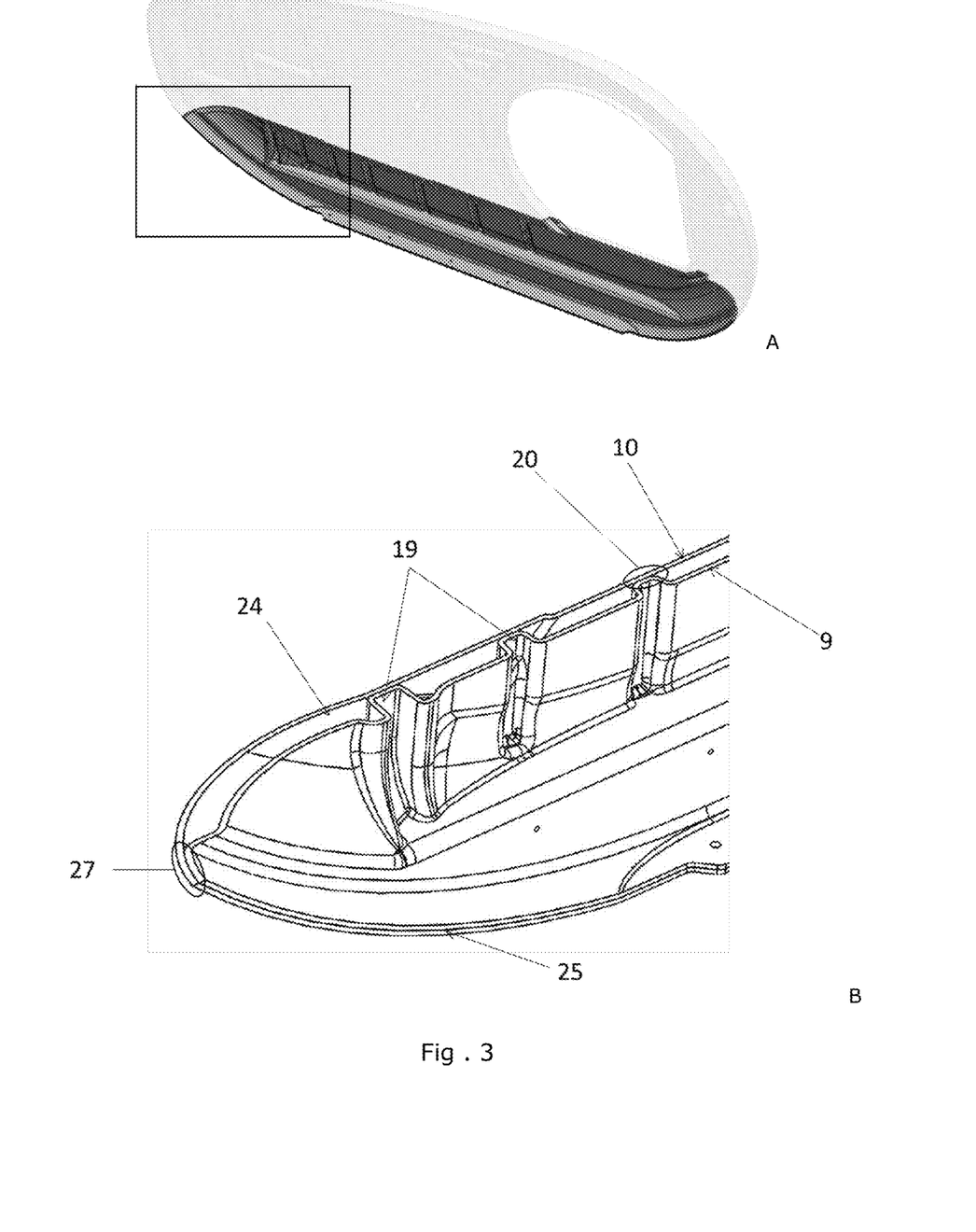
FIG. 3 is a transactional view of a side panel of the housing.

FIG. 3 outlines how each of the opposite side panels and the at least two connecting panels are assembled. In FIG. 3A a side panel is shown where the lower part of the panel is a transaction view of the side panel. FIG. 3B is an enlargement of the square shown in FIG. 3A being a transection of the lower part of a side panel. Each of the opposite side panels and the at least two connecting panels are made from an inner shell 9 and an outer shell 10 with a space 24 between them, where insulation is placed. The inner shell 9 and an outer shell 10 for each of the opposite side panels and the at least two connecting panels is connected on the peripheral edges 25 prior to assembly through connection points 20. Formations or indents 19 are made in the inner shell to provide features such as ventilation channels and points for attaching different parts of the interior to the panels. These indents 19 also have connecting points 20 between the inner 9 and the outer 10 shell. Fixing means such as glue is used to fix the inner and outer shell together at the connecting points. The figure also shows parallel coinciding surfaces 27 of the peripheral edges of the inner 9 and the outer 10 shell of each panel. The peripheral edges of each two connecting panels are formed in the same manner for attachment of two panels.

Figure 4:
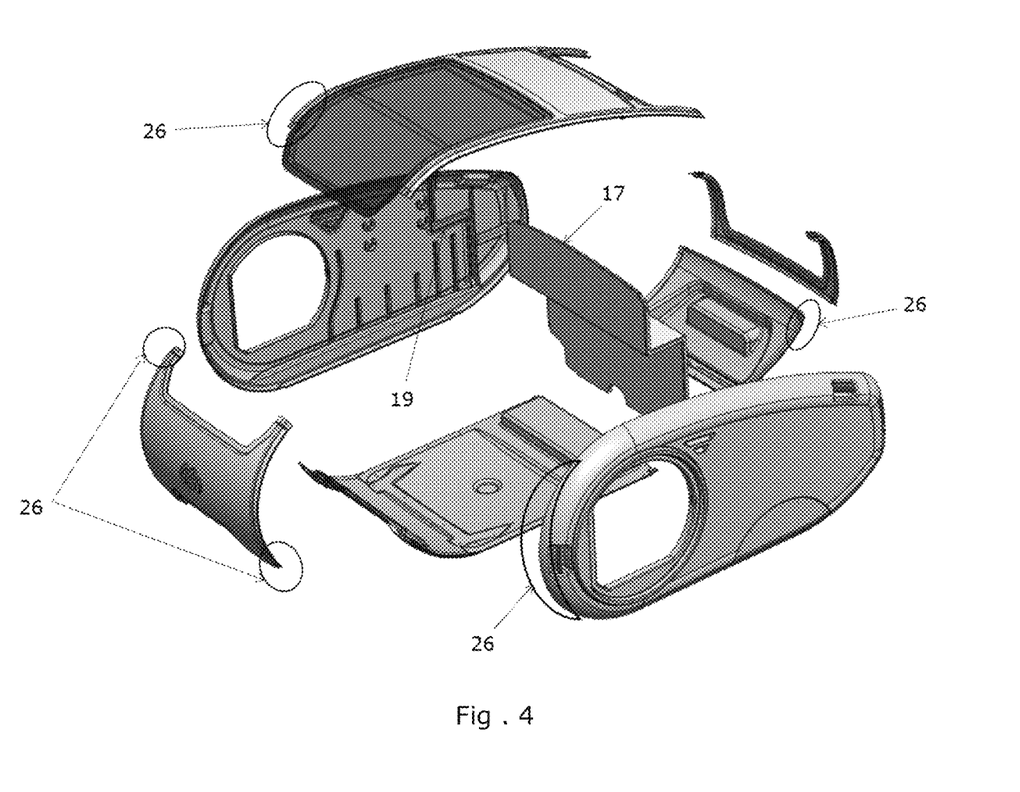
FIG. 4 is an explosive view of the housing showing some of the features which provide strength to the housing.

FIG. 4 is the same explosive view of the housing as in FIG. 2 showing the individual panels for the assembly of a housing according to some embodiments of the invention. The drawing shows how the panels are connected at concave or curved corners 26 of the housing, contributing the egg-like shape of the housing. In the embodiment shown herein, it is the combination of the connection between the inner and outer shell of each of the opposite side panels and the connection of the panels through connecting points at the peripheral edges and through indents in the middle portion of each panel, which provides the strength of the design of the housing of the present invention. The attachment of the interior panel 17 separating the boot portion from the rest of the housing is made by connection to a slot or indent 19 in the inner part of the side panel and by connection to the upper and lower panel, but these connections also contribute to the strength of the assembled housing. The slots or indents may further contribute to form ventilation and support features in the interior of the housing.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A caravan trailer, comprising:
   a chassis further comprising wheels,
   a cradle portion mounted on said chassis, and
   a housing secured in the cradle portion, said housing being assembled from a plurality of panels, further comprising:
   opposite side panels,
   at least two connecting panels forming a front, a back, a lower, and an upper side of the housing,
   a door,
   wherein each of the plurality of panels are made from an inner shell and an outer shell, and
   wherein the inner shell and the outer shell of each of the plurality of panels have parallel peripheral edges for connecting the inner shell and the outer shell prior to assembly.

2. The caravan trailer according to claim 1, wherein the parallel peripheral edge of the inner shell of each of the plurality of panels form a parallel coinciding surface to the peripheral edge of a corresponding outer shell.

3. The caravan trailer according to claim 2, wherein the parallel coinciding surfaces of the inner shell and an outer shell of each of the panels comprise connection points for attaching together each panel prior to assembly of the caravan trailer.

4. The caravan trailer according to claim 1, wherein the inner shell of one or more of the plurality of panels further comprise structural indents or protrusions in a middle section of the inner shell forming a parallel contacting surface to a surface in the middle section of the outer shell of the corresponding panel.

5. The caravan trailer according to claim 4, wherein structural indents or protrusions in the middle section of the inner shell comprises a flat portion forming a parallel coinciding surface to a flat surface in the middle section of the outer shell of the corresponding panel.

6. The caravan trailer according to claim 1, wherein the parallel peripheral edges of each of the panels form a parallel coinciding surface to the peripheral edge of the corresponding peripheral edge of the panel it is connected to.

7. The caravan trailer according to claim 6, wherein the parallel coinciding surfaces of each of the panels comprise connection points for attaching together the panels of the housing during assembly of the caravan trailer.

8. The caravan trailer according to claim 1, wherein the inner shell and the outer shell of each panel are connected to one another at their peripheral edges via glue and the panels of the housing are connected to one another via glue.

9. The caravan trailer according to claim 1, further comprising a hatch in the back of the caravan to open into a boot portion of the caravan.

10. The caravan trailer according to claim 9, further comprising an interior panel separating the boot portion from the rest of the housing.

11. The caravan trailer according to claim 10, further comprising a window in a top panel.

12. The caravan trailer according to claim 1, wherein the at least two connecting panels comprise four connecting panels, four connecting panels comprising a front panel, a back panel, a lower panel, and an upper panel of the housing.

13. The caravan trailer according to claim 12, further comprising a hatch panel portion between the upper panel and the back panel of the housing.

14. The caravan trailer according to claim 1, wherein the inner shell and the outer shell of the opposite side panels and the at least two connecting panels have an insulation layer between them.

15. The caravan trailer according to claim 1, wherein connecting corners between the opposite side panels and the at least two connecting panels are curved or concave.

16. The caravan trailer according to claim 1, wherein the opposite side panels and the at least two connecting panels are made from ABS plastic.

17. The caravan trailer according to claim 1, wherein the cradle is made from fibre plastic.

18. The caravan trailer according to claim 1, wherein the inner shell and outer shell of each panel are separated from one another via a space.

19. The caravan trailer according to claim 18, wherein
the parallel peripheral edges of each of the panels form a parallel coinciding surface to the peripheral edge of the corresponding peripheral edge of the panel it is connected to, and
connecting corners between the opposite side panels and the at least two connecting panels are curved or concave.

20. The caravan trailer according to claim 1, wherein the inner shell and the outer shell of each of the plurality of panels are separately formed structures, each inner shell being inserted into a recess defined by an inner surface of an associated outer shell prior to assembly of the housing.

21. A method for assembling a caravan trailer, said method comprising:
g) providing a chassis further comprising wheels,
h) providing a cradle portion and mounting said cradle portion on said chassis,
i) providing a housing, said housing being assembled from and containing:
   i. opposite side panels,
   ii. at least two connecting panels forming a front, a back, a lower and an upper side of the housing,
   iii. a door,
j) wherein the opposite side panels and the at least two connecting panels are made from an inner shell and an outer shell,
k) said inner shell and an outer shell being connected on the peripheral edges prior to assembly,
l) connecting the opposite side panels and the at least two connecting panels on their peripheral edges, and
m) mounting said housing on said cradle portion.

22. The method according to claim 21, wherein the opposite side panels and the at least two connecting panels are attached together through indents or protrusions in the inner or outer shell of the opposite side panels and the at least two connecting panels.

23. The method according to claim 21, wherein attachment of the opposite side panels and the at least two connecting panels and through indents or protrusions in middle sections of said panels is made by using a two-component glue.

* * * * *